Patented May 24, 1949

2,470,804

UNITED STATES PATENT OFFICE 2,470,804

ENRICHMENT COMPOSITION

Thomas S. H. Clark, Rensselaer, N. Y., assignor, by mesne assignments, to Winthrop-Stearns Inc., New York, N. Y., a corporation of Delaware No Drawing. Application May 16, 1947,
Serial No. 748,649

6 Claims. (Cl. 167—72)

The present invention relates to a composition of matter for enriching food products with supplemental dietary factors, and more particularly to a composition for enriching dough, from which bread and pastry products are prepared by baking, in the form of a tablet which is readily disintegrated in the presence of moisture and which contains a highly assimilable source of iron.

It has been known for a number of years that the average American diet is deficient in vitamins and minerals and recent governmental and private investigations have confirmed this fact. The various efforts which have heretofore been made to fortify or enrich divers food products to make up for their dietary deficiencies have been limited in at least one respect, as follows: Because of their extensive consumption and relatively inexpensive nature, bread and flour have been especially recognized as appropriate foodstuffs to be enriched and, while it has been possible to incorporate the desired amounts of vitamin $B_1$, iron and other enriching factors in bread, the iron thus provided is not highly assimilable when the heretofore employed iron sources are used. This is because the sources of iron have not been such as will provide iron in highly assimilable form in nutritionally adequate amounts within the compass of the legally prescribed limits of iron compounds which can be added to dough. Sodium iron pyrophosphate, which is occasionally used for this purpose, does not provide iron in a readily available form and if it is attempted to add enough of this iron compound to provide the requisite total amount of available iron the amount is so large as to go beyond the legal limitations provided by various State laws and, in addition, may have a highly adverse effect upon the appearance, taste and texture of the bread itself. Efforts have been made to overcome this situation, but, so far as I am aware, the problem has still not been successfully solved. Some of these efforts have been in the direction of endeavoring to utilize other iron compounds, such as ferric orthophosphate, but this material, while it gives an otherwise satisfactory tablet, contains iron in no more assimilable form than sodium iron pyrophosphate. Such iron compounds as ferric chloride have also been tried and, while the iron content of ferric chloride is known to be in a considerably more assimilable form than the iron of either sodium iron pyrophosphate or ferric orthophosphate, nevertheless it has been found that ferric chloride cannot be employed because it is too hygroscopic, and so, when incorporated in tablets which are conventionially and desirably used as the physical form for enrichment purposes, the disintegration time of such tablets in the presence of moisture is so greatly prolonged as to make it impossible to use the same because bakers cannot and will not employ enriching tablets which require a disintegration time of more than approximately one minute, since longer times interfere with their times production schedules and established dough-making and baking practices. Ferric chloride cannot be used in powdered form because, being hygroscopic, it causes caking and agglomeration.

Ferrous sulfate is another example of a compound of iron in which the iron is known to be in highly assimilable form but, like ferric chloride, its physical disadvantages prevented its use for enrichment purposes and hence, despite the well-known assimilability of its iron content, it found no application in baked goods enrichment. Workers skilled in the art of tablet-making have tried many variations both of known and of new methods in attempts to formulate a suitable enrichment tablet containing ferrous sulfate together with other dietary ingredients; however, they have been unsuccessful in obtaining a tablet with the necessary disintegrative and other properties. For instance, tablets which have been compounded show relatively rapid disintegration times when first prepared, but, on storing, show progressively increasing times for disintegration.

I have discovered that a satisfactory enrichment composition and tablet, containing ferrous sulfate as the major source of assimilable iron, can be produced by incorporating therewith in the composition or tablet a quantity of sodium iron pyrophosphate or ferric orthophosphate. A tablet of such character has suitable, rapid disintegrative properties, not only immediately after being prepared, but also after being exposed to conditions of high humidity for extended periods. Also included in the tablet of my invention are excipients to aid in furnishing satisfactory tablet properties, such excipients including starch, talc, magnesium stearate, and the like. Moreover, there can be conveniently incorporated in my tablet various other dietary factors including vitamins, such as thiamine hydrochloride, riboflavin, nicotinic acid, and the like; and other minerals, such as sources of dietary calcium and the like.

Either sodium iron pyrophosphate or ferric orthophosphate, in amounts ranging from about 3% to about 20% (by weight), is employed as an essential ingredient in the composition or tablet of my invention in conjunction with up to about 50% of ferrous sulfate. These salts coact with each other and with the other ingredients to yield a stable tablet that disintegrates rapidly under conditions of use and which has the other properties necessary for dough enrichment, such as ready assimilability of the iron content.

My tablets are, as already indicated, satisfactory for use in the enrichment of bread and other baked cereal goods from the standpoint of stability of the vitamins, stability of the ferrous iron, and rapid disintegrative time. Some of these tablets were stored under conditions of high humidity together with tablets made in the same manner, but containing only ferric orthophosphate as the iron source. After a period of five months' exposure to various humid climatic conditions, the tablets containing ferrous sulfate disintegrated, on the average, three times as fast as the tablets containing only ferric orthophosphate. Moreover, despite this exposure to adverse conditions, the ferrous sulfate-containing tablets were found to possess essentially the originally introduced quantities of ferrous iron and vitamins, and to have satisfactory physical characteristics regarding appearance, absence of undue breakage, etc.

The following examples illustrate merely specific embodiments of my invention and so it will be understood that my invention is not limited to said examples but only by the scope of appended claims.

EXAMPLE 1

A convenient size of tablet for the enrichment of fifty pounds of flour for bread may weigh seven grams. Such a tablet may contain the following quantities of enrichment factors and other ingredients:

| | Grams |
|---|---|
| Thiamine hydrochloride | 0.100 |
| Riboflavin | 0.035 |
| Nicotinic acid | 0.600 |
| Ferrous sulfate (28% iron) | 1.786 |
| Talc | 0.400 |
| Starch | 3.309 |
| Sodium iron pyrophosphate or ferric orthophosphate | 0.700 |
| Magnesium stearate | 0.070 |
| | 7.000 |

EXAMPLE 2

A satisfactory bread enrichment tablet also can be obtained by varying the percentage of sodium iron pyrophosphate or ferric orthophosphate within the limits of about 3% to about 20%. For example, tablets containing the following ingredients with varying quantities of sodium iron pyrophosphate (S. I. P. P.) were made up and successfully utilized:

3% S. I. P. P.

| | Grams |
|---|---|
| Thiamine hydrochloride | 0.100 |
| Riboflavin | 0.045 |
| Nicotinic acid | 0.600 |
| Ferrous sulfate (28% iron) | 1.786 |
| Talc | 0.400 |
| Starch | 2.829 |
| Sodium iron pyrophosphate | 0.180 |
| Magnesium stearate | 0.060 |
| | 6.000 |

7% S. I. P. P.

| | Grams |
|---|---|
| Thiamine hydrochloride | 0.100 |
| Riboflavin | 0.045 |
| Nicotinic acid | 0.600 |
| Ferrous sulfate (28% iron) | 1.786 |
| Talc | 0.400 |
| Starch | 2.589 |
| Sodium iron pyrophosphate | 0.420 |
| Magnesium stearate | 0.060 |
| | 6.000 |

15% S. I. P. P.

| | Grams |
|---|---|
| Thiamine hydrochloride | 0.100 |
| Riboflavin | 0.045 |
| Nicotinic acid | 0.600 |
| Ferrous sulfate (28% iron) | 1.786 |
| Talc | 0.400 |
| Starch | 2.109 |
| Sodium iron pyrophosphate | 0.900 |
| Magnesium stearate | 0.060 |
| | 6.000 |

20% S. I. P. P.

| | Grams |
|---|---|
| Thiamine hydrochloride | 0.100 |
| Riboflavin | 0.045 |
| Nicotinic acid | 0.600 |
| Ferrous sulfate (28% iron) | 1.786 |
| Talc | 0.400 |
| Starch | 1.809 |
| Sodium iron pyrophosphate | 1.200 |
| Magnesium stearate | 0.060 |
| | 6.000 |

EXAMPLE 3

The ratios of the various ingredients of my invention can be varied within rather wide limits while still yielding a satisfactory tablet. Thus, in a bread enrichment tablet of a given weight, the weight percentages of the enrichment factors can range as follows: thiamine hydrochloride, up to 3%; riboflavin, up to 2%; nicotinic acid, up to 20%; and ferrous sulfate, up to 50%. Also, the percentages of starch and talc can vary up to 50% and 10%, respectively. Thus, a tablet with larger proportions of enrichment factors may contain the following ingredients:

| | Grams |
|---|---|
| Thiamine hydrochloride | 0.190 |
| Riboflavin | 0.070 |
| Nicotinic acid | 1.200 |
| Ferrous sulfate (28%) | 3.215 |
| Talc | 0.400 |
| Starch | 1.155 |
| Sodium iron pyrophosphate | 0.700 |
| Magnesium stearate | 0.070 |
| | 7.000 |

EXAMPLE 4

A tablet to be added to fifty pounds of semolina for enrichment of macaroni products may contain the following ingredients:

| | Grams |
|---|---|
| Thiamine hydrochloride | 0.200 |
| Riboflavin | 0.085 |
| Nicotinic acid | 1.250 |
| Ferrous sulfate (28%) | 1.833 |
| Talc | 0.400 |
| Starch | 2.462 |
| Ferric orthophosphate | 0.700 |
| Magnesium stearate | 0.070 |
| | 7.000 |

I claim:

1. An enrichment tablet for the fortification of cereal doughs and batters which comprises ferrous sulphate as the major source of assimilable iron and an additional iron compound selected from the group consisting of sodium iron pyrophosphate and ferric orthophosphate.

2. An enrichment tablet for the fortification of cereal doughs and batters which comprises ferrous sulfate as the major source of assimilable iron and sodium iron pyrophosphate.

3. An enrichment tablet for the fortification of cereal doughs and batters which comprises up to about 50% of ferrous sulfate as the major source of assimilable iron and from about 3-20% of sodium iron pyrophosphate.

4. An enrichment tablet for the fortification of cereal doughs and batters which comprises ferrous sulfate as the major source of assimilable iron and ferric orthophosphate.

5. An enrichment tablet for the fortification of cereal doughs and batters which comprises up to about 50% of ferrous sulfate as the major source of assimilable iron and from about 3-20% of ferric orthophosphate.

6. A stable tablet for the fortification of cereal doughs and batters with assimilable iron said tablet comprising up to 50% ferrous sulfate as the major source of assimilable iron, about 3 to 20% sodium iron pyrophosphate to provide satisfactory disintegrative properties, up to 3% thiamine hydrochloride, up to 2% riboflavin, up to 20% nicotinic acid, up to 45% starch, up to 10% talc, and approximately 1% magnesium stearate.

THOMAS S. H. CLARK.

REFERENCES CITED

The following references are of record in the file of this patent:

UNITED STATES PATENTS

| Number | Name | Date |
|---|---|---|
| 2,357,069 | Barackman | Aug. 29, 1944 |
| 2,410,417 | Andersen | Nov. 5, 1946 |
| 2,414,974 | Nielsen | Jan. 28, 1947 |

OTHER REFERENCES

Street—Journal of Nutrition, vol. 26, pages 187-195.